E. CUTTER.
Boxes for Vaccine Matter.

No. 134,467. Patented Dec. 31, 1872.

Witnesses.
A. H. Norrie
Harry C. Birch

Inventor.
Ephraim Cutter.
By James L. Norris.
Atty.

UNITED STATES PATENT OFFICE.

EPHRAIM CUTTER, OF WOBURN, MASSACHUSETTS.

IMPROVEMENT IN BOXES FOR VACCINE MATTER.

Specification forming part of Letters Patent No. 134,467, dated December 31, 1872.

*To all whom it may concern:*

Be it known that I, EPHRAIM CUTTER, of Woburn, Massachusetts, have invented an Improved Cell for the Conservation of Crusts of Vaccine Virus, of which the following is a specification:

The object of my invention is to provide a device for holding a crust or crusts of vaccine virus so that the same may be safely and conveniently carried about or transported by mail or otherwise, and at the same time be protected from the action of the air, water, and heat; and it consists of a cylindrical case or cup, and a cover or cap, provided, respectively, with a male and female screw, and each made open in the center, and containing two disks of glass separated by a ring of India rubber, so as to leave a space between the two disks, in which is to be placed the crust or vaccine virus.

Figure 1:
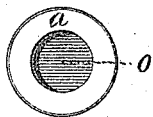
Figure 2:
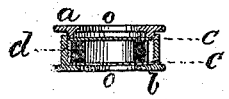

In the accompanying drawing, Figure 1 represents a top view, and Fig. 2 a transverse section, of my device.

*a* represents the upper portion or cap, which is made to screw into the cup or lower portion *b*, each being made with an opening, *o*, in the center and provided with projecting milled edges. These parts are to be made of metal, hard rubber, or other suitable material. In the lower portion *b* is a seat, upon which rests a glass disk, *c*, fitting snugly within the case, and upon this disk is placed a ring of India rubber or other suitable material. Upon this ring is placed another glass disk, *c*, thus forming a space between the two disks for the reception of the crust of vaccine virus.

In fastening the cover on, the screw-edge is made to press upon the upper disk, thus rendering the space between the disks entirely air and water tight.

The openings in the upper and lower portions of the device admit of a ready inspection of the crust inclosed, without the necessity of opening the case, and the glass disks are so protected by rims in each part as to admit of rough handling in transportation without danger of being broken.

The device is very simple in construction, as well as convenient and durable.

The rubber ring may be dispensed with, and the glass disks secured within the upper and lower portions of the device; but the use of the ring is preferable, as it tends to insure the inclosed space being air and water tight.

What I claim as my invention, and desire to secure by Letters Patent, is—

1. The device composed of the parts *a* and *b*, secured together by flanges furnished with male and female screw threads, having each an open center and provided with glass disks, as and for the purpose specified.

2. In combination with the above, the rubber ring, as and for the purpose set forth.

In testimony whereof I have signed my name to this specification in the presence of two subscribing witnesses.

EPHRAIM CUTTER.

Witnesses:
   LEWIS L. WHITNEY,
   JOHN L. PERHAM.